United States Patent [19]

Nieczyporowicz et al.

[11] Patent Number: 6,023,462
[45] Date of Patent: Feb. 8, 2000

[54] FIXED WIRELESS LOOP SYSTEM THAT RANKS NON-ASSIGNED PN CODES TO REDUCE INTERFERENCE

[75] Inventors: Leon L Nieczyporowicz, W. Jordan; Philip L Stephenson, Salt Lake City; Thomas R Giallorenzi, Herriman; Robert W Steagall, North Salt Lake, all of Utah

[73] Assignee: L-3 Communications Corporation, New York, N.Y.

[21] Appl. No.: 08/988,413

[22] Filed: Dec. 10, 1997

[51] Int. Cl.[7] .............................. H04B 7/216; H04J 13/02
[52] U.S. Cl. .......................... 370/335; 370/342; 370/441
[58] Field of Search .................................. 370/208, 209, 370/329, 335, 342, 441, 503, 341, 431, 468, 479, 514, 515; 375/200, 206, 208; 455/422, 450, 38.1, 517, 63

[56] References Cited

U.S. PATENT DOCUMENTS

| | | | |
|---|---|---|---|
| 5,309,474 | 5/1994 | Gilhousen et al. | 370/209 |
| 5,410,538 | 4/1995 | Roche et al. | 370/479 |
| 5,499,236 | 3/1996 | Giallorenzi et al. | 370/441 |
| 5,577,025 | 11/1996 | Skinner et al. | 370/209 |
| 5,583,853 | 12/1996 | Giallorenzi et al. | 370/441 |
| 5,604,732 | 2/1997 | Kim et al. | 370/342 |
| 5,751,761 | 5/1998 | Gilhousen et al. | 375/200 |
| 5,757,767 | 5/1998 | Zehavi | 370/208 |
| 5,809,059 | 9/1998 | Souissi et al. | 370/437 |

*Primary Examiner*—Ricky Ngo
*Attorney, Agent, or Firm*—Perman & Green, LLP

[57] ABSTRACT

Disclosed is a method for operating a fixed wireless system (FWS) having a radio base unit (RBU) that uses a code division multiple access (CDMA) airlink for communicating with a plurality of subscriber units (SUs) within a coverage area of the RBU. The method includes establishing, from a set of pseudonoise (PN) spreading codes, a subset of PN spreading codes that are currently assigned to SUs and a subset of PN spreading codes that are currently not assigned to SUs. The method further ranks the PN spreading codes from the subset of non-assigned PN spreading codes by an amount of interference experienced by the use of each non-assigned PN spreading code, and assigns to an SU requiring a PN spreading code a PN spreading code from the set of non-assigned PN spreading codes that is ranked as having a least amount of interference. The step of ranking the non-assigned PN spreading codes is preferably performed periodically, and includes the steps of assigning, in turn, individual ones of the PN spreading codes from the set of non-assigned PN spreading codes to a correlator of the RBU, and determining an amount of noise output from the correlator resulting from the use of the PN spreading code.

3 Claims, 5 Drawing Sheets

FIXED WIRELESS LOOP SYSTEM THAT RANKS NON-ASSIGNED PN CODES TO REDUCE INTERFERENCE

FIELD OF THE INVENTION

This invention relates generally to wireless local loop systems and, in particular, a CDMA-based fixed wireless loop system providing voice and data communications between a radio base unit and a plurality of subscriber stations.

BACKGROUND OF THE INVENTION

Local loop by traditional definition is that portion of a network that connects a subscriber's home to a central office switch. This is, however, an expansive definition that does not hold true as the network extends into the local loop by means of Digital Loop Carrier and Digital Cross Connects. For the purposes of this invention, local loop is considered as the connection from the subscriber's premises to the connecting point in the network, whatever the nature of that connection may be.

Until recently the local loop was mostly based on copper plant supplemented by microwave radio links for remote areas or difficult terrain. Over the last decade fiber optics have made significant inroads into the local loop (also referred to as "access" network) reaching closer to subscriber homes and buildings. Sonet based access networks bring fiber to the curb. These fiber based solutions can provide very high bandwidth services, reliably and cost-effectively, in urban/metropolitan areas with significant number of business customers. In fact, most access providers in the U.S. have used such fiber based plant to provide access services to U.S. business customers.

The copper and fiber based solutions, while economical in many situations, still suffer from a number of drawbacks.

For example, in an area without an existing network infrastructure, it is very time consuming and expensive to build a new network. The expense is primarily in the labor, rights acquisition (for right of way or easement), and in electronics (for fiber based access). Overall the process is very slow due to extensive effort involved in acquiring right of way and in performing the required construction, aerial and/or underground. also, in locations with extensive but congested existing infrastructure, it is often very expensive to add capacity due to already full ducts and cables, and sometimes impossible to add capacity without resorting to upgrading the entire system. In addition, wireline solutions tend to have costs that are distance sensitive, hence they are inherently unsuitable for sparse/scattered demand. Wireline networks are also not amenable to redeployment, which results in stranded assets when demand (consumer) moves. Wireline networks also cannot be rapidly deployed in emergency situations.

The term "fixed wireless loop", or FWL, connotes a fixed wireless based local access. However, it is often mixed with limited mobility solutions under the broader term "Radio Access". Irrespective of the type of radio technology, all fixed wireless or radio access systems use wireless means to provide network access to the subscriber. Broadly speaking, there are three main categories of fixed wireless solutions.

Fixed cellular systems are primarily based on existing analog cellular systems like AMPS (in North America) or NMT (in Nordic countries).

Fixed cordless systems are primarily based on the European DECT standard using digital TDMA Time Division Duplex technology.

Bespoke systems are designed specifically for fixed wireless application. Conventional systems in this category are the analog microwave point to multi-point systems. More recently deployed systems operate at higher frequencies and employ digital technologies. These systems may be derived from similar cellular technologies, but are not based on any existing agreed standards.

Of the three main categories of fixed wireless systems there is no one solution that is clearly superior to others. If the primary need for a system operator is to provide voice oriented service wherein voice quality is not a limiting factor, then often a fixed cellular system is adequate, and even desirable because of its relatively low equipment cost. For very high density url)an situations, a DECT solution may be desirable due to its high load carrying capacity and its pico-cellular architecture. Microwave solutions are best for sparse populations. Bespoke systems function well over a wide range of situations and have the best overall quality and desirable features, however they are likely to be more expensive, at least in the near future.

Most residential consumers in developing economies are mainly interested in adequate voice service. However, most business customers require data and fax service in addition to voice. With the growing popularity of home computers and Internet access, a need is arising to provide residential consumers with high speed data services at home. As such, the general trend is in the direction that all customers, both residential and business, will demand high quality voice and data services.

A problem that arises in a code division multiple access (CDMA) based FWL type system is in the assignment of pseudonoise (PN) spreading codes to different users. Ideally the PN codes form a set of codes that are completely orthogonal and non-interfering. However, in practice complete orthogonality is difficult or impossible to realize. This results in interference between two users transmitting with two non-orthogonal PN codes. Furthermore, the amount of interference between different codes of the set of PN codes can vary depending on which particular codes are assigned at any given time.

OBJECTS AND ADVANTAGES OF THE INVENTION

It is a thus a first object and advantage of this invention to provide an improved fixed wireless loop system that fulfills the foregoing and other needs and requirements.

It is a further object and advantage of this invention to provide an improved fixed wireless loop system that continuously ranks non-assigned PN codes based on interference, and that assigns a new user a PN code that is currently ranked as being a PN code that exhibits a least amount of interference.

SUMMARY OF THE INVENTION

The foregoing and other problems are overcome and the objects and advantages are realized by methods and apparatus in accordance with embodiments of this invention. Disclosed is a method for operating a fixed wireless system having a radio base unit (RBU) that uses a code division multiple access (CDMA) airlink for communicating with a plurality of subscriber units (SUs) within a coverage area of the RBU. The method includes establishing, from a set of pseudonoise (PN) spreading codes, a subset of PN spreading codes that are currently assigned to SUs and a subset of PN spreading codes that are currently not assigned to SUs. The method further ranks the PN spreading codes from the subset of non-assigned PN spreading codes by an amount of interference experienced by the use of each non-assigned PN spreading code, and assigns to an SU requiring a PN spreading code a PN spreading code from the set of non-assigned PN spreading codes that is ranked as having a least amount of interference.

The step of ranking the non-assigned PB spreading codes is preferably performed periodically, and includes the steps of assigning, in turn, individual ones of the PN spreading codes from the set of non-assigned PN spreading codes to a correlator of the RBU, and determining an amount of noise output from the correlator resulting from the use of the PN spreading code.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
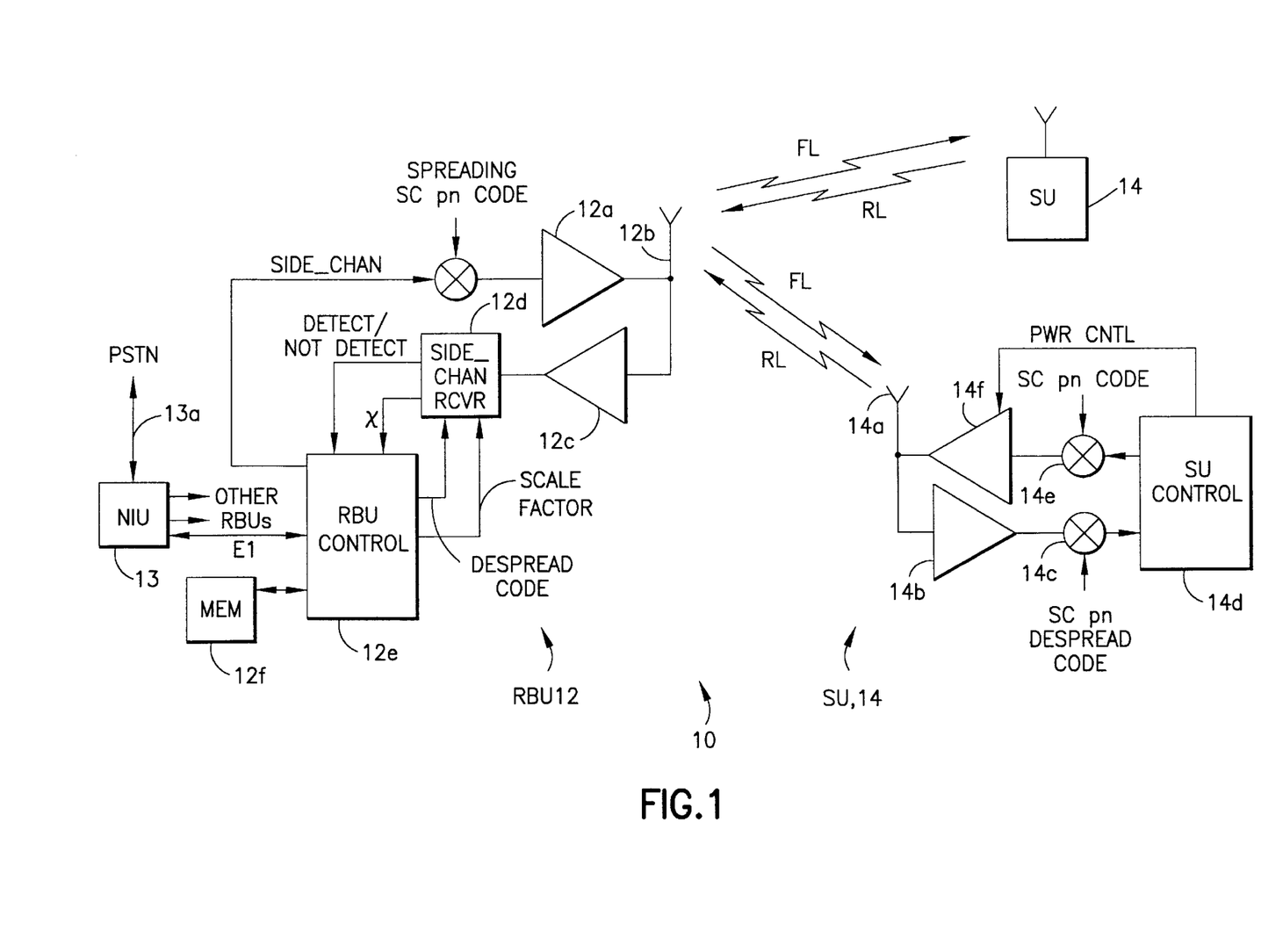
FIG. 1 is a simplified block diagram of a synchronous, DS-CDMA fixed wireless communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is a bespoke system based on digital radio technology. Specifically, the FWS 10 employs direct sequence spread spectrum based CDMA techniques over an air link to provide local access to subscribers. It offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

Some important attributes of the FWS 10 include: wireline voice quality delivered at 32 Kbps; high throughput for data and fax applications with 32/64 Kbps throughput; high service reliability with good tolerance for noise and ingress; secure airlink; and support of enhanced services such as priority/emergency calling, both inbound and outbound.

The FWS 10 has a three to five times capacity advantage over conventional asynchronous CDMA technologies, and a three to seven times capacity advantage over currently available Time Division Multiple Access (TDMA) technology, due to its ability to use a frequency reuse of one.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value $\chi$, as described below. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

In addition, the FWS 10 has an Element Management System or EMS (not depicted) that provides Operations, Administration, Maintenance, and Provisioning (OAM&P) functions for the NIU 13 and RBU 12. The functioning of the EMS is not germane to an understanding of this invention, and will not be further described in any great detail.

The NIU 13 is the interface to the public network for the system 10. Its primary purpose is to provide the specific protocols and signaling that are required by the public network. These protocols can vary by country as well as by customer, and possibly even by the connecting point in the network.

In a preferred embodiment of this invention the NIU 13 can connect to a maximum of 15 RBUs 12 using one to four E1 connections per RBU 12, with four E1 connections being used for a fully populated RBU 12. In addition, each NIU 13 is sized for up to, by example, 10,000 subscribers. Time Slot 16 on each E1 trunk is used for passing control information between the NIU 13 and the attached RBUs 12, as well as for passing information to and from the controlling EMS. The protocol is based on the HDLC format and optimized to enhance RBU-NIU communication.

Specific functions provided by the NIU 13 include: initialization of the RBU 12; provisioning of dial tone and DTMF to the SUs 14; set up and tear down of voice and data calls; maintenance of Call Detail Record (CDR) data; HDLC Protocol (data link protocol to RBU Link Control Processor); billing system interface; Common Channel Signaling (CCS) for ringing and onhook/offhook detection; glare detection in NIU, RBU, and SU; call priority management; channel reassignment for calls in progress; detection of hook flash to enable plain old telephone service (POTS) and enhanced POTS calling features; 32/64 Kbps rate change initialization; pay phone capability (12/16 KHz tone detection, line reversal); priority and emergency number calling; accommodation of country specific signaling interfaces such as E&M, R1, R2, R2 variants, and C7; and system modularity: analog/digital options for both line side and trunk side.

The normal mode of operation for the SU 14 is a compressed speech mode using ADPCM encoding according to the ITU-T G.721 standard. This toll quality, 32 Kbps service is the default used whenever a non-X.21 channel is established with the RBU 12 (X.21 channels are configured a priori when provisioned by the EMS/NIU). The 32 Kbps channels may be used for voice band data up to 9600 b/s if desired. When the channel rate bumps to 64 Kbps PCM encoded voice/data due to detection of a fax/modem start tone, fax and modem rates of at least 33.6 Kbps are possible.

Figure 2:
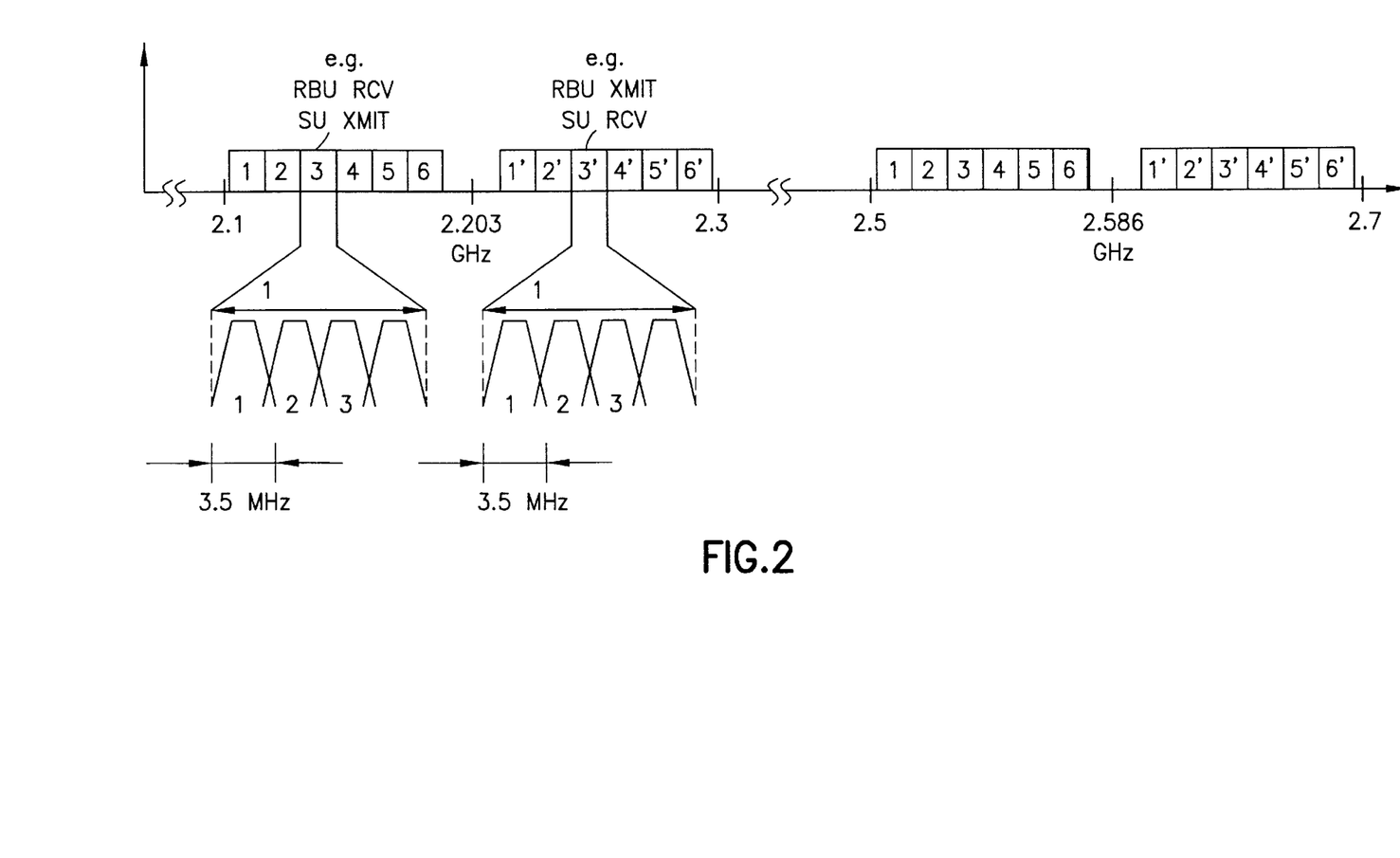
FIG. 2 is an exemplary frequency allocation diagram of the system of FIG. 1.

The SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band. The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the effective traffic carrying capacity is 120 channels at 32 Kbps.

The spectral efficiency of the FWS 10 is three to five times that of conventional CDMA systems primarily because the FWS 10 employs bi-directional Synchronous CDMA. Competing systems, including those based on IS-95, are asynchronous or synchronous only in one direction. The bi-directional synchronicity permits the FWS 10 to use near orthogonal spreading codes and gain maximum possible data carrying capacity.

Radio emissions lose energy as they travel in air over long distances. In order to ensure that the received signal energy from a distant subscriber is not completely overwhelmed by that of a near subscriber, the RBU 12 controls the power level of the SUs 14. In the preferred embodiment only the reverse channel power (from SU 14 to the RBU 12) is controlled by the RBU 12. The power control is primarily established at SU 14 initialization.

Subsequent power adjustments are infrequent and are made in response to transient environmental conditions. The closed loop power control is implemented by comparing against a desired power level and making incremental adjustments until the desired level is achieved.

The forward channel power control is not needed since each SU 14 receives its entire signal at only one level. The RBU 12 merely needs to ensure that the received signal strength by the farthest SU 14 is sufficient for its application.

It is not always desirable to have an extended range. In a dense urban or even a suburban setting, one needs to deploy the system in a cellular architecture as depicted below. To reduce interference between sectors and between cells in such a deployment, the range of the RBU is limited overall as well as selectively in specific directions. Such range control may be accomplished using a directional master antenna 12b at the RBU 12, as well by controlling overall RBU power.

When one of the SUs 14 detects an off-hook (the user has picked up the phone), it transmits an outgoing call request on one of six reverse synchronous side channels in a Slotted ALOHA fashion. The side channel is chosen at random. The RBU 12 processes the request and, providing an active channel is available, sends an outgoing call reply to the SU 14 which contains the active channel codes (both forward and reverse). In the meantime, the RBU 12 begins to transmit forward side channel data on the newly activated channel and at a given time, begin to transmit the active call data. The SU 14, which is listening to the forward side channel, receives the active channel assignment and switches at a superframe boundary to the active codes. The SU 14 then begins to receive the side channel data and then the active call data.

When an incoming call is received by the NIU 13 for one of the SUs 14 in the local loop, the RBU 14 is notified over the E1 link. The RBU 12 first checks to determine if the intended SU 14 is busy. If not, the RBU 14 sends a message to the SU 14 on the forward side channel, the message containing the active channel codes. The call processing then continues in the same manner as the outgoing call processing discussed above.

If all channels are busy and the NIU 13 receives an incoming call for a non-busy SU 14, it provides a subscriber busy tone to the caller unless the called SU has priority inbound access (such as a hospital, fire station, or police), in which case the NIU 13 instructs the RBU 12 to drop the least priority call to free up a channel for the called SU 14. Similarly, if an SU 14 initiates a request for service and no traffic channels are open, then the RBU 12 provides the dial tone on a temporary traffic channel and receives the dialed number. If the dialed number is an emergency number the RBU 12 drops a least priority call to free up a traffic channel and connects the free channel to the SU 14. If the called number is not an emergency number then the SU 14 is provided a special busy tone indicating a "wait for service" condition.

Figure 6:
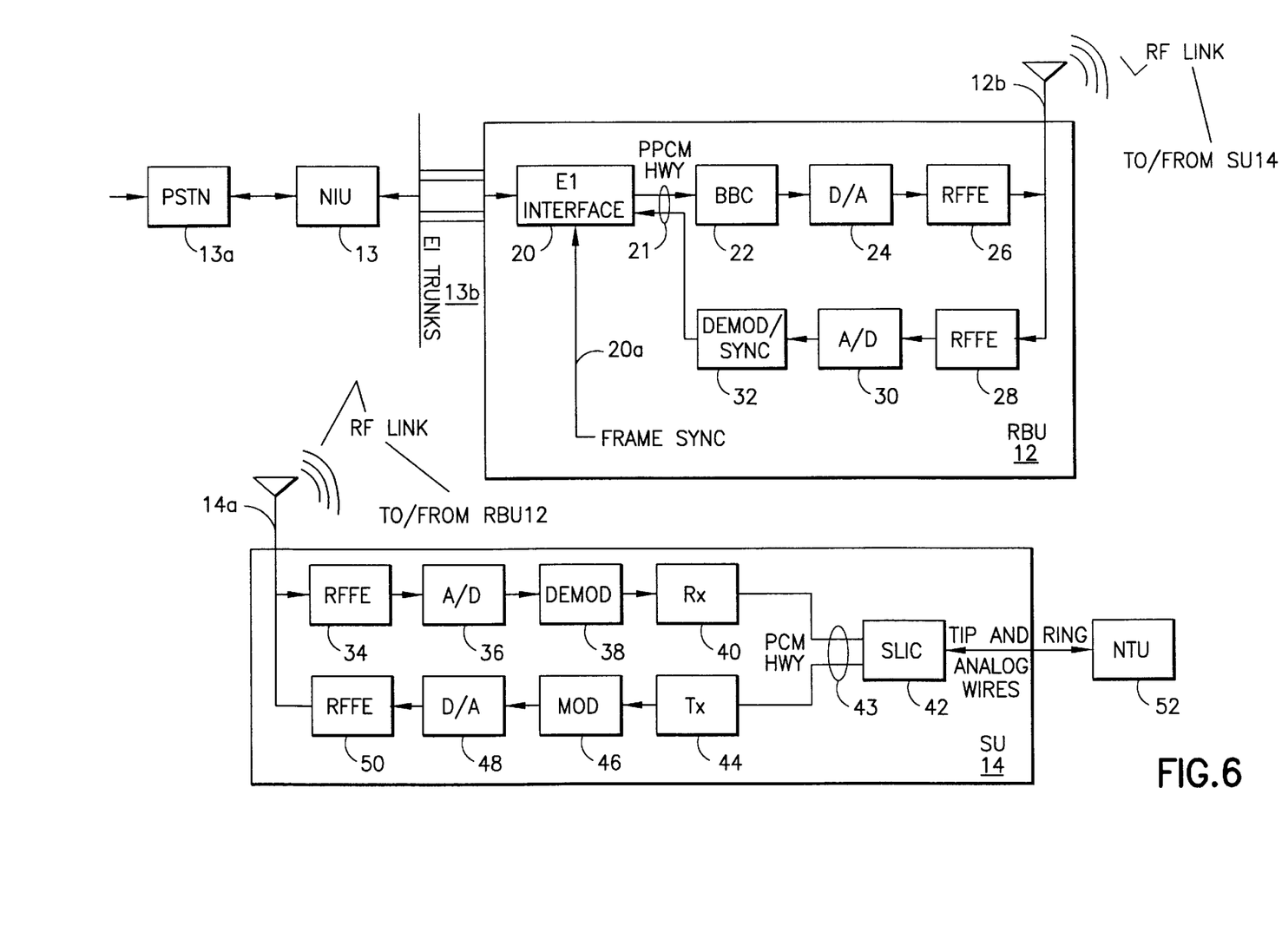
FIG. 6 is a block diagram that illustrates the RBU and SU of FIG. 1 in greater detail.

Reference is now made to FIG. 6 for illustrating the RBU 12 and SU 14 in greater detail.

An incoming call from the PSTN 13a passes through the NIU 13 to 64 Kbps per channel E1 trunks 13b and then to a RBU-resident E1 interface 2U. The E1 interface 20 optionally performs an A-Law ADPCM algorithm for the compression of the 64 Kbps channel to a 32 Kbps channel that is placed on a PCM highway 21 time slot. If the A-Law ADPCM compression is bypassed, the 64 Kbps channel is split into two 32 Kbps channels and placed onto the PPCM Highway 21. In the preferred embodiment the RBU 12 can accommodate up to 128 32 Kbps channels, and each SU 14 can accommodate up to four 32 Kbps channels. The PPCM Highway 21 operates in conjunction with a frame synchronization (FrameSync) signal 20a, which represents a master timing pulse that is generated every 16 ms. All calls to and from the RBU 12 pass through the PPCM Highway 21 and the E1 interface 20. For the case of an incoming call the signal is applied to a baseband combiner (BBC) 22 and thence to a D/A converter 24 and a transmit radio frequency front-end (RFFE) 26 before being applied to the antenna 12b for transmission to the SU 14. At the SU 14 the incoming call signal is received by the antenna 14a and is applied to a receive RFFE 34, an A/D 36, demodulator 38 and a receiver 40. The SU 14 includes a subscriber line interface circuit (SLIC) 42 that couples a pulse code modulation (PCM) Highway 41 to a network termination unit (NTU) 52. In the reverse direction a call originates at the NTU 52 and passes through the SLIC 42 and PCM Highway 41 to a transmitter 44, modulator 46, D/A converter 48 and a transmit RFFE 50. The signal is applied to the SU antenna 14a and is received by the RBU antenna 12b. The received signal is applied to a receive RFFE 28, A/D converter 30, a demodulator and synchronization unit 32, and then to the PPCM Highway 21 and E1 interface 20 for connection to the PSTN 13a via one of the E1 trunks 13b and the NIU 13.

The RBU 12 controls the master timing for the entire FWS 10. Timing throughout the FWS 10 is referenced to the periodic timing pulse generated at the PPCM Highway 21, i.e., to the FrameSync signal 20a. In the FWS 10 all data is grouped into equal-sized packets referred to as frames, which in turn are grouped into super-frames with, for example, three frames making up one super-frame.

Having described the overall architecture and capabilities of the FWS 10, a detailed description of this invention will now be made.

Reference is first made to commonly assigned and allowed U.S. patent application Ser. No. 08/606,378, filed Feb. 23, 1996, now U.S. Pat. No. 5,805,584 entitled "A Multi-User Acquisition Procedure for Point-To-Multipoint Synchronous CDMA Systems", by S. C. Kingston, T. R. Giallorenzi, R. R. Sylvester, D. Matolak, and P. Smith, the disclosure of which is incorporated by reference herein in its entirety. In this commonly assigned patent application a technique is disclosed for the SU 14 to acquire the correct code timing for a synchronous CDMA forward channel link in the presence of multi-user interference (MUI). This technique exploits the orthogonality of the PN codes used to determine the proper code phase by purposely despreading a PN code (i.e., a null code) which is known to not be present (i.e., not transmitted by the RBU 12). This is done to overcome the problem that arises when using a conventional acquisition procedure when many users are active. In this case the interference energy of P–1 interfering users, with processing gain P, can be nearly as strong as the energy of the desired user's signal. As a result, the standard acquisition approach, wherein a detection is declared when the energy of a matched filter output (or sliding correlator output) is larger than a threshold, is not viable in a heavily loaded system. A simplifying assumption made herein is that the frequency offset between the carrier of the incoming signal and the receiver's local oscillator is zero.

Figure 5:
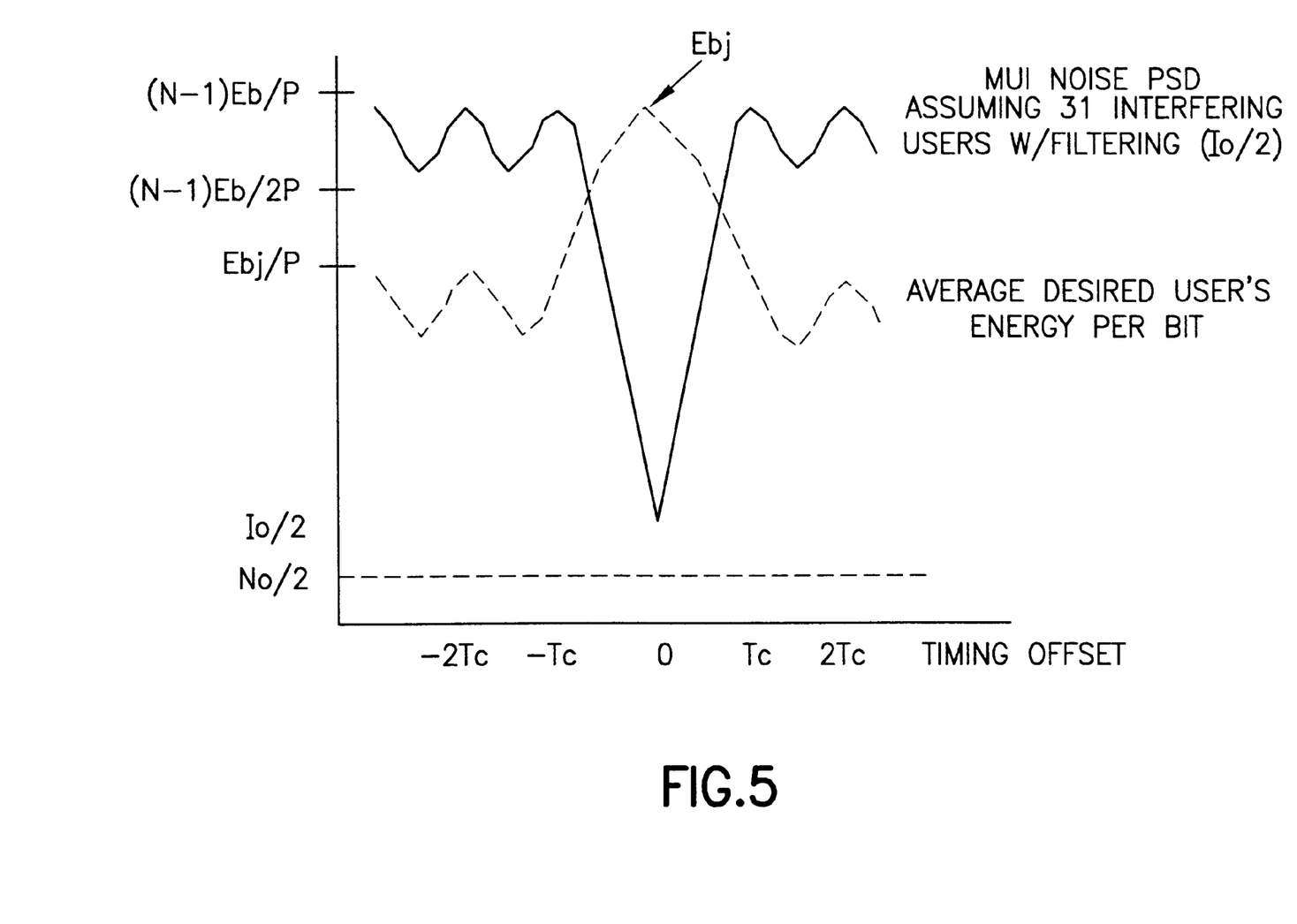
FIG. 5 is a graph that illustrates the energy of a matched filter output due to a desired user's signal, due to interfering users, and due to background noise as a function of the timing offset of the matched filter.

FIG. 5 illustrates the energy of the matched filter output due to the desired user's signal, due to the interfering users, and due to the background noise as a function of the timing offset of the matched filter. It should be noted that on the forward channel, the user signals are all assumed to perfectly synchronized with each other. The different curves shown in FIG. 5 represent the various components of the received signal, and the sum of these components make up the received strength. It is important to note that the MUI energy due to a receiver chip timing offset is comparable to the energy of the desired user's signal when the receiver is not offset. The implication of this is that a standard acquisition algorithm would not be able to easily distinguish the difference between the offset and synchronized phases. In fact, unless additional averaging takes place, the signal energy is essentially equal to the noise variance, which implies a detection signal-to-noise ratio (SNR) of approximately 0 dB.

It should also be noted that the noise due to MUI and the noise due to background noise are both zero mean noise processes. In the conventional detection procedure, the absolute value of the larger of I and Q despreader outputs are taken and the results are averaged over some dwell time. The fact that the noise has a zero mean implies that it is possible to increase the decision SNR by averaging the detection statistics. However, in the case of a heavily loaded system, the averaging time would be required to be long in order to create a large enough SNR to determine reliably whether the receiver is correctly synchronized to a signal.

In contrast with the standard acquisition approach, and in accordance with the invention disclosed in the commonly assigned patent application referred to above, if the receiver 14b of the SU 14 instead despreads a PN code which is not transmitted, then the noise will be "tuned out" when the receiver comes into alignment with the interfering signals. This implies that the SU receiver 14b can look for the "hole in the noise" which occurs at the zero offset phase, and thus determine when the noise energy at a sliding correlator output drops below a threshold. At this time the acquisition circuit can declare that a lock has occurred. This technique can be referred to as a multi-user test (MUT).

Figure 3:
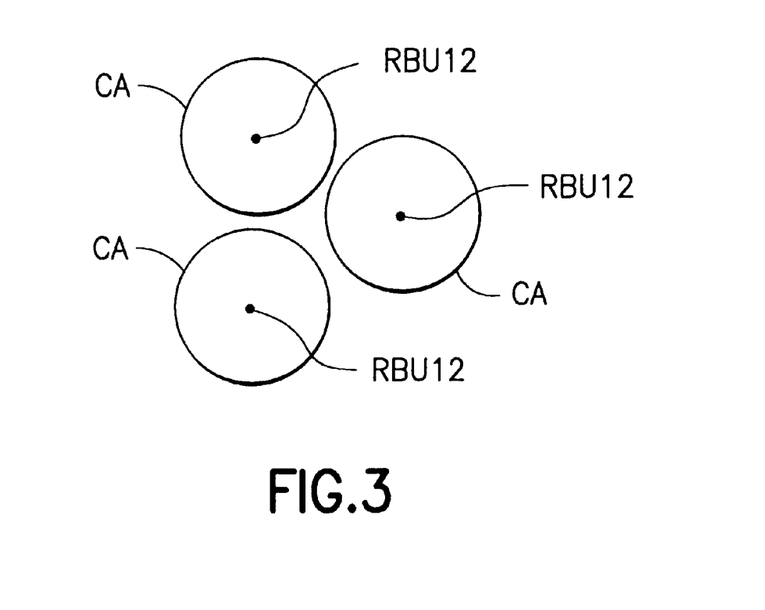
FIG. 3 depicts an exemplary arrangement of multiple RBUs each having a coverage area CA.

FIG. 3 depicts an exemplary arrangement of multiple RBUs 12 each having an associated coverage area (CA). In the preferred embodiment of this invention there are up to 19 sets of scrambled Walsh-Hadamard pseudonoise (PN) spreading codes defined, with each set containing 128 PN codes of length 128. Each RBU 12 operates with a different set of 128 PN codes (one PN code in each set is the above-described null code). The PN spreading codes used by a particular RBU 12 are not guaranteed to be orthogonal to the set of PN spreading codes used by an adjacent RBU 12, and furthermore the timing of adjacent RBUs is not aligned. These factors result in interference between RBU CAs. Also, the filtering performed by the RBU and SU receivers causes some distortion, thereby destroying any possibility of achieving complete orthogonality within a given PN code set. The end result is a variable amount of interference that can be experienced using a given PN code, wherein the interference varies as function of at least the identities of the PN codes that are currently assigned within a given RBU CA, as well as those codes that are currently assigned within neighboring RBU CAs. By example, during a certain period of time PN codes 1 and 17 may exhibit a minimal amount of mutual interference within a given one of the RBU CAs, while at the same time PN codes 5 and 17 may exhibit a significant amount of mutual interference. At some later time the situation may be reversed.

The inventors have realized that if the RBU 12 were to assign PN codes to new users without regard for these factors then some users could be assigned PN codes that are not optimum, at that particular time, for achieving the low symbol error rates that are an important feature of the FWS 10.

Figure 4:
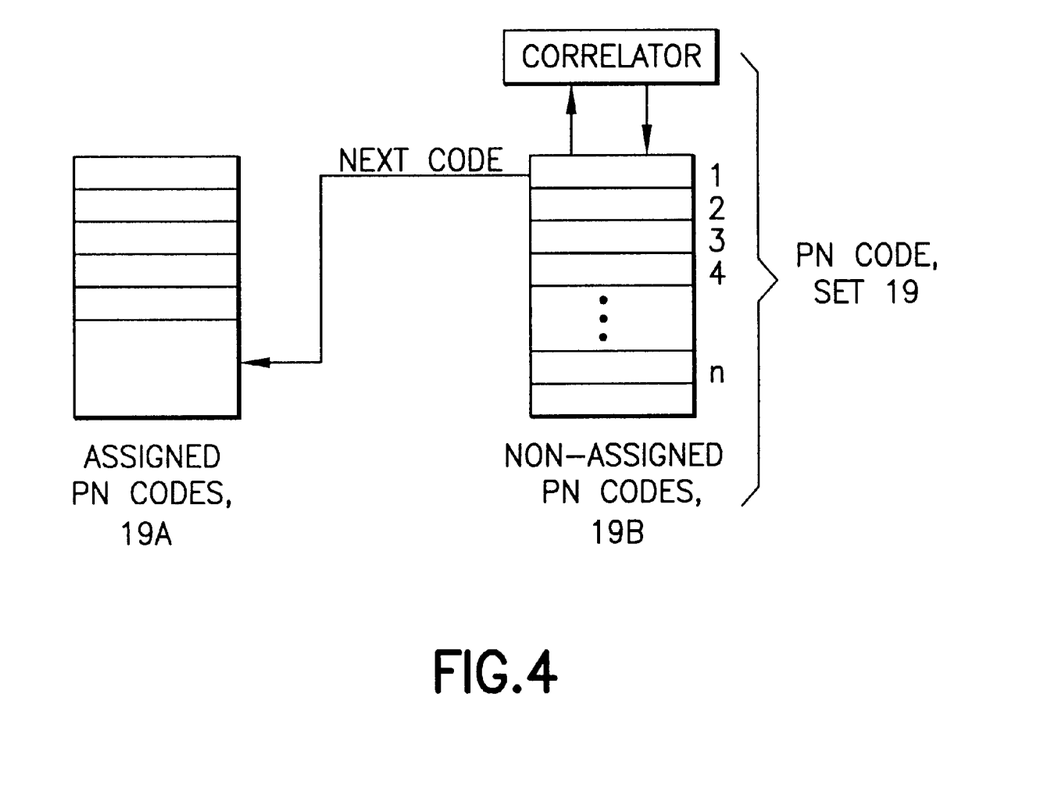
FIG. 4 illustrates a set of PN codes, the set being divided into currently assigned codes and currently non-assigned codes, with the non-assigned codes being ranked in order of determined interference in accordance with this invention.

FIG. 4 illustrates an illustrative set 19 of PN spreading codes that are assigned to one of the RBUs 12 of FIG. 3, the set 19 being divided into a subset of currently assigned codes 19A and a subset of currently non-assigned codes 19B. In accordance with this invention each RBU 12 operates to rank the subset of non-assigned codes 19B in order of interference. This is preferably achieved in a manner similar to that described above for the SU-executed null code MUT determination.

In accordance with this invention the RBU 12 periodically (e.g., once per second) sets one of its correlators to despread the received signal energy using one of the non-assigned PN codes 19B. The output of the correlator (despreader) is then detected to determine the amount of received energy (noise) that results from the use of the non-assigned PN code. Each PN code from the set of non-assigned PN codes 19B is similarly tested in succession, and the non-assigned PN codes of the set 19B are then ranked in order of quality (e.g., 1–n, with the PN code ranked as 1 being the non-assigned PN code that currently exhibits the least interference and the PN code ranked as 'n' being the non-assigned PN code that currently exhibits the most interference.) The ranking of the non-assigned PN codes from the set 19B can be performed as a background task by the RBU controller 12e during spare CPU time.

When the RBU 12 receives a request by one of the SUs 14 to be assigned a PN code, the RBU 12 selects as a next to be assigned PN code that PN code ranked as the least interfering within the subset of non-assigned PN codes 19B.

By so ranking the non-assigned PN codes by interference level the RBU 12 is enabled to accommodate the variabilities in PN code performance induced by the changing combinations of currently assigned PN codes in the RBU's CA, as well as the variabilities induced by the PN codes that are currently assigned by neighboring (if any) RBUs 12.

While described in the context of specific types of PN codes having a particular length, numbers of PN codes per RBU PN code set, and so forth, it should be realized that these specific embodiments are not intended to be read in a limiting sense upon the teachings of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a fixed wireless system having a radio base unit (RBU) that uses a code division multiple access (CDMA) airlink for communicating with a plurality of subscriber units (SUs) within a coverage area of the RBU, comprising steps of:

establishing, from a set of pseudonoise (PN) spreading codes, a first subset of PN spreading codes that are currently assigned to SUs and a second subset of PN spreading codes that are currently not assigned to SUs;

ranking the PN spreading codes from the second subset of non-assigned PN spreading codes by an amount of interference experienced by the use of each non-assigned PN spreading code, wherein the step of ranking includes the steps of applying, in turn, individual ones of the PN spreading codes from the second set of non-assigned PN spreading codes to a correlator and determining an amount of interference within a reception frequency band that correlates with the applied one of the PN spreading codes, thereby determining an amount of unwanted energy that is output from the correlator resulting from the use of the PN spreading code within the reception frequency band; and assigning, to a SU requiring a PN spreading code, a PN spreading code from the second set of non-assigned PN spreading codes that is ranked as having a least amount of interference.

2. A method for operating a fixed wireless system having a plurality of radio base units (RBUs) each of which uses a code division multiple access (CDMA) airlink for communicating with a plurality of subscriber units (SUs) within a coverage area of each of the RBUs, comprising steps of:

establishing in each RBU, from a set of pseudonoise (PN) spreading codes used by the RBU, a subset of PN spreading codes that are currently assigned to SUs in the coverage area of the RBU and a subset of PN spreading codes that are currently not assigned to SUs in the coverage area of the RBU;

periodically ranking in each RBU the PN spreading codes from the subset of non-assigned PN spreading codes by an amount of interference experienced by the use of each non-assigned PN spreading code, the amount of interference being due at least to currently assigned PN spreading codes within the coverage area of the RBU and currently assigned PN spreading codes within the coverage area of at least one other RBU, wherein the step of periodically ranking includes the steps of applying, in turn, individual ones of the PN spreading codes from the second set of non-assigned PN spreading codes to a correlator of the RBU and determining an amount of interference within a reception frequency band that correlates with the applied one of the PN spreading codes, thereby determining an amount of unwanted energy that is output from the correlator resulting from the use of the PN spreading code within the reception frequency band; and assigning, to an SU requiring a PN spreading code from the RBU, a PN spreading code from the set of nonassigned PN spreading codes that is ranked as having a least amount of interference.

3. A fixed wireless system (FWS), comprising:

a plurality of subscriber units (SUs);

at least one radio base unit (RBU) that uses a code division multiple access (CDMA) airlink for communicating with SUs within a coverage area of said RBU, said RBU operating with a set of pseudonoise (PN) spreading codes that comprises a subset of PN spreading codes that are currently assigned to SUs and a subset of PN spreading codes that are currently not assigned to SUs; and said RBU comprising means for periodically ranking the PN spreading codes from the subset of non-assigned PN spreading codes by an amount of interference experienced by the us e of each non-assigned PN spreading code, and for assigning to an SU requiring a PN spreading code a PN spreading code from the set of non-assigned PN spreading codes that is ranked as having a least amount of interference; wherein said ranking means applies, in turn, individual ones of the PN spreading codes from the set of non-assigned PN spreading codes to a correlator and determines an amount of interference energy output from the correlator, within a reception frequency band, that correlates with the applied one of the PN spreading codes, thereby determining an amount of unwanted energy that is output from the correlator resulting from the use of the PN spreading code within the reception frequency band.

* * * * *